US005895432A

United States Patent [19]

Zarchy

[11] Patent Number: 5,895,432

[45] **Date of Patent: *Apr. 20, 1999**

[54] METHOD AND APPARATUS FOR SIMULTANEOUSLY COUPLING PLURAL TERMINAL DEVICES THROUGH SERIAL PORT AND REMOTE CONTROL APPARATUS INCORPORATING SAME

[75] Inventor: Richard R. Zarchy, Crystal Lake, Ill.

[73] Assignee: Snap-on Incorporated, Kenosha, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/510,378

[22] Filed: Aug. 2, 1995

[51] Int. Cl.[6] .................................................. G06F 19/00

[52] U.S. Cl. .................................................. 701/2; 701/29

[58] Field of Search ...................... 364/423.098, 431.04, 364/424.034; 395/822, 868, 871, 309; 701/1, 2, 29, 102, 101

[56] References Cited

U.S. PATENT DOCUMENTS

| | | | |
|---|---|---|---|
| 3,667,101 | 6/1972 | Kloth . | |
| 3,787,810 | 1/1974 | Wiggins et al. . | |
| 3,890,836 | 6/1975 | McKenzie et al. . | |
| 4,188,664 | 2/1980 | DeShon . | |
| 4,381,427 | 4/1983 | Cheal et al. . | |
| 4,418,381 | 11/1983 | Molusis et al. . | |
| 4,440,987 | 4/1984 | Heep et al. . | |
| 4,579,407 | 4/1986 | Shimada . | |
| 4,607,379 | 8/1986 | Marshall, Jr. et al. | 357/377 |
| 4,690,475 | 9/1987 | McElroy . | |
| 4,696,527 | 9/1987 | Ding et al. . | |
| 4,941,845 | 7/1990 | Eppley et al. . | |
| 5,177,665 | 1/1993 | Frank et al. . | |
| 5,181,859 | 1/1993 | Foreman et al. . | |
| 5,192,226 | 3/1993 | Wang . | |
| 5,340,333 | 8/1994 | Schroth . | |

OTHER PUBLICATIONS

Dr. Gordon W. Wolfe, Computer Peripherals That You Can Build, 1982, pp. 50–53, 59–61, 95, 96 and 102–104.

*Primary Examiner*—William A. Cuchlinski, Jr.
*Assistant Examiner*—Edward J. Pipala
*Attorney, Agent, or Firm*—McDermott, Will & Emery

[57] ABSTRACT

An apparatus and method is provided for electrically interfacing a first terminal device and a second terminal device to a shared serial port interface of a host by first connecting the first terminal device to a portion of the lines of the serial port interface, then connecting the second terminal device to at least some of the remaining lines of the serial port interface, and initializing the host for data communication with both the first and second terminal devices. In the disclosed embodiment, the second terminal device is a remote control apparatus interfaced to unused lines of a serial port interface of a host device. The host device is of the type adapted for simultaneous communication with both a terminal device and the remote control apparatus through a single-dedicated serial communications port interface.

4 Claims, 2 Drawing Sheets

Fig 1
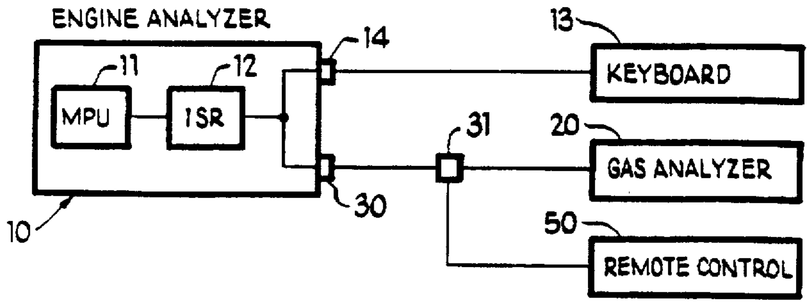
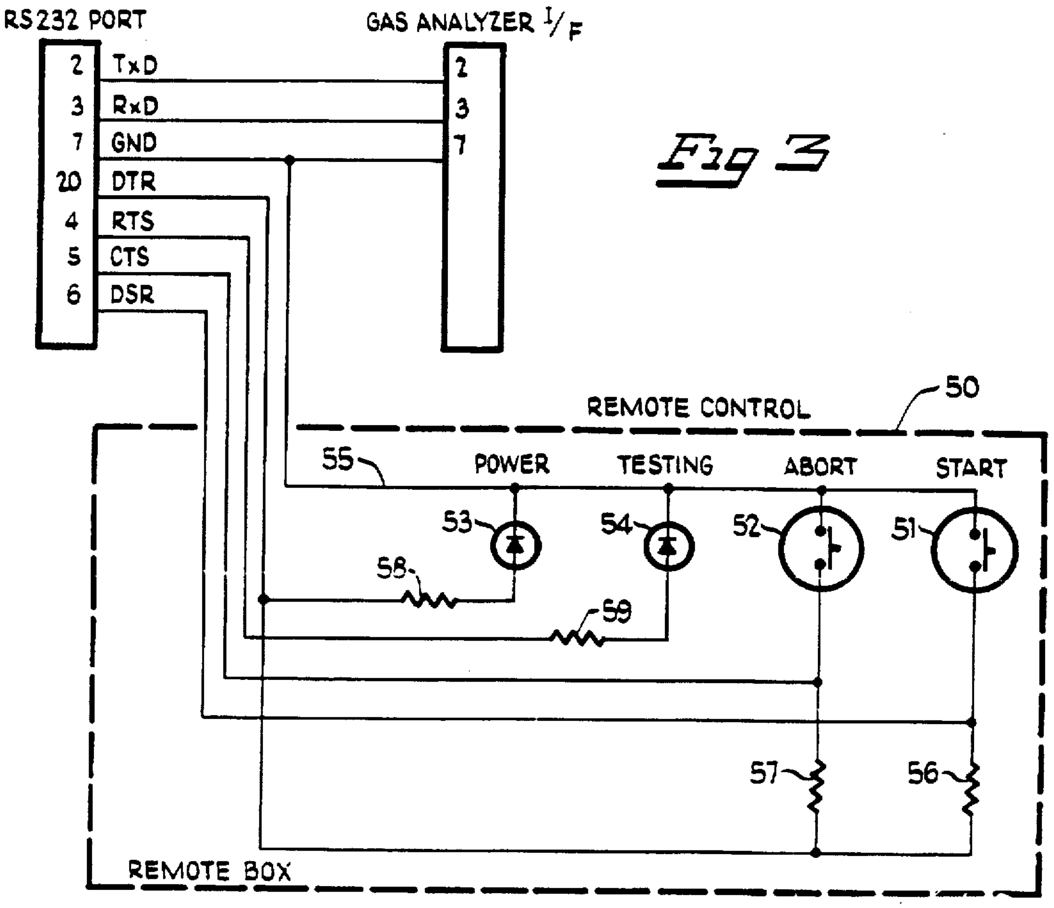
Fig 3

METHOD AND APPARATUS FOR SIMULTANEOUSLY COUPLING PLURAL TERMINAL DEVICES THROUGH SERIAL PORT AND REMOTE CONTROL APPARATUS INCORPORATING SAME

BACKGROUND OF THE INVENTION

1. Field of the Invention

The present invention relates generally to a wired, non-intrusive remote control device and to a method for interfacing the remote control device.

2. Description of the Prior Art

In many present-day computer applications it is desirable to interconnect the computer to a variety of peripheral units. These units may include printers, terminals, digital storage units and even remote control devices. In addition, it may also be desirable to interconnect two or more computers in a network arrangement, either in one location or in remote locations.

In order to effect communication between the computer and the peripheral units, and/or between networked computers, the communicating device must convert its internal electronic signals into a set of electronic signals which can be properly received and processed by the computer. One industry standard set of electronic signals which has been established for communications between various devices is known as "RS232" standard interface signals, in which a digital "0" and "1" are represented by plus or minus twelve volt signals, respectively.

In order to operate with RS232 signal levels, a computer must have its own interface circuitry to convert the RS232 voltage levels into the internal voltage levels actually used in the machine. In many computers, a special RS232 serial communications interface or "port" is provided for communication with external units. Each such port includes a number of lines or conductors.

A problem that has arisen with many computers is that there are usually not enough ports available to accommodate simultaneous interconnection of all necessary external units. This problem is particularly noteworthy with automotive engine analyzers. Engine analyzers are essentially special-purpose computer systems which communicate with a number of peripheral devices, such as gas analyzers, printers, and the like, via conventional RS232 serial communications ports. Each peripheral device is assigned to a dedicated, single-device port for communication with the engine analyzer. Some devices, like printers, use most if not all of the available RS232 port lines to effect data communication. Others, like gas analyzers, use only a few of the available RS232 port lines, with the remaining lines going unused.

Under engine analyzer control, gas analyzers are used to diagnose the exhaust gases of a motor vehicle, including collecting and measuring concentration levels of certain ingredients of exhaust gases. Typically, the gas analyzer test involves having an automotive technician subject the vehicle under test to varying driving conditions. This requires the technician to be seated in the driver's seat of the running vehicle so that the vehicle speed (MPH) may be appropriately varied during the test. Presently, in order to properly start or abort the test, the seated technician must have an assistant standing next to the engine analyzer entering the appropriate keyboard commands (i.e., 'start' test, 'abort' test). This is because the technician is necessarily a considerable distance from the engine analyzer and particularly the analyzer's command-entering keyboard. The technician is then guided by a drive trace on the analyzer display which assists him in maintaining the vehicle within a varying range of speeds. The present inventors have recognized that by interfacing a wired remote control device to the engine analyzer, appropriate test initiation and related commands can be remotely communicated by the technician to the engine analyzer, obviating the need for an assistant.

However, because the maximum number of available serial RS232 ports are predetermined by the system architecture of the engine analyzer, adding even one extra port to accommodate communication with a remote control device, the only function of which would be to remotely start or abort the emissions test described above, is generally not practical. It is possible to use non-wired remote control units which communicate by radio or light waves with the engine analyzer, however this also requires modification of the engine analyzer.

SUMMARY OF THE INVENTION

It is a general object of the present invention to provide a remote control device which can be easily interfaced for communication with a host device via the unused lines of an existing serial communications port, the used lines of which port interface a peripheral unit to the host device.

It is a further object of the present invention to provide a remote control device which is powered by the host device and which requires a minimum amount of circuitry and components for interfacing with the host device.

It is a further object of the present invention to provide a method for interfacing a remote control device to the serial communications port of the host device in a non-intrusive manner, such that the communication between the host device and the peripheral unit attached to the same port remains unaffected.

These and other features of the present invention are attained by electrically interfacing a first terminal device and a second terminal device to a shared serial port interface of a host by first connecting the first terminal device to a portion of the lines of the serial port interface, then connecting the second terminal device to at least some of the remaining lines of the serial port interface, and initializing the host for data communication with both the first and second terminal devices.

In the disclosed embodiment, the second terminal device is a remote control apparatus interfaced to unused lines of a serial port interface of a host device. The host device is of the type adapted for simultaneous communication with both a terminal device and the remote control apparatus through the serial port interface. The remote control apparatus includes first, second and third resistors connected at a common end to a first of the unused lines on the serial port interface. A start switch is connected between the opposite end of the first resistor and a ground reference line of the serial port interface. An abort switch is connected between the opposite end of the second resistor and the ground reference line. A power-indicating LED is connected between the opposite end of the third resistor and ground reference line. A fourth resistor is connected at one end to a second of the unused lines. A test-indicating LED is connected between the opposite end of the fourth resistor and the ground reference line. The opposite ends of the first and second resistors are further respectively connected to third and fourth ones of the unused lines.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a system interconnection diagram of the present invention showing a data processing system including a gas analyzer and a remote control device simultaneously electrically interfaced to a host engine analyzer via a single serial communications port;

FIG. 3 is a schematic circuit diagram of the remote control device of FIGS. 1 and 2.

DETAILED DESCRIPTION OF THE PREFERRED EMBODIMENT

Figure 2:
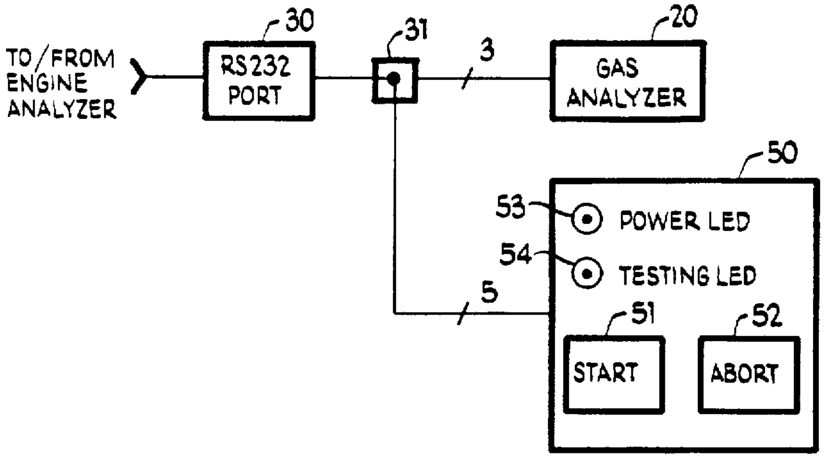
FIG. 2 is a system interconnection diagram of a portion of the system of FIG. 1 with the remote control device shown in greater detail.

Referring to FIG. 1, there is illustrated a host computing system 10 having a microprocessing unit (MPU) 11 which is coupled via a hardware timer interrupt logic (ISR) 12 to a plurality of external resources or terminal devices, including a keyboard 13, a gas analyzer 20, and a remote control device 50. In the illustrative embodiment, the host computing system 10 is an engine analyzer. The keyboard 13 is electrically interfaced with the engine analyzer 10 through a dedicated communication port 14. The gas analyzer 20 and remote control device 50, on the other hand, are electrically interfaced to a shared RS232 serial communications port 30 in accordance with the present invention, as can best be seen in FIGS. 2 and 3.

An appropriate RS232 interface cable 31 simultaneously electrically couples the remote control device 50 and gas analyzer 20 to the engine analyzer's serial RS232 port 30, as will be explained below. The gas analyzer 20 communicates with the engine analyzer 10 via the RS232 cable 31 using only three wires or serial lines of the RS232 interface (Tx, Rx, and GND). The remaining RS232 wires or serial lines are unused by the gas analyzer and are thus free to be used by the remote control device 50.

The remote control device 50 is equipped with a normally open start switch 51, a normally open abort switch 52, a power-indicating LED 53, and a test-indicating LED 54, all of which are user-accessible but are internally wired, as shown in FIG. 3, to interface with the analyzer, during an emissions test application. Internally, appropriate ends of switches 51, 52 and the cathode ends of LEDs 53, 54 are connected by a common wire connection 55 to the GND reference line of the RS232 cable 31. In this regard, the remote control device 50 shares the GND line with the gas analyzer 20. The opposite end of start switch 51 is connected to one end of a 5 k-ohm pull-up resistor 56 and also to the unused RS232 handshaking line commonly designated as DSR on the cable 31. The opposite end of abort switch 52 is connected to one end of a second 5 k-ohm pull-up resistor 57 and also to the unused handshaking line designated as CTS on the cable 31. The respective anode ends of LEDs 53, 54 are connected to corresponding ends of 680 ohm resistors 58, 59. The opposite end of resistor 58 and the opposite ends of resistors 56, 57 are all commonly joined to the handshaking line designated DTR on the RS232 cable 31. Lastly, the opposite end of resistor 59 is directly connected to the handshaking line designated RTS on the cable 31.

The interfacing of the remote control device 50 with the engine analyzer 10 will now be described in two parts:

(i) power-up initialization mode; and (ii) key press monitor mode.

During system power-up initialization, the analyzer 10 powers the remote control device 50 by asserting DTR high. If the remote control device 50 is properly interconnected to the serial port 30 of the analyzer using a cable 31 interconnection scheme as described above, the power LED 53 will glow. Because the start and abort switches 51, 52 are respectively pulled up to the voltage level on the DTR line by pull-up resistors 56, 57, the initialization routine could optionally test for shorts or the like by verifying the voltage level on lines CTS and DSR. Towards this end, since the remote control device is powered by the DTR line, an auto-detect process could troubleshoot the communications interface by confirming that:

(a) when DTR is cleared, DSR and CTS go low; and/or (B) when DTR is cleared, asserting RTS does not affect DSR or CTS.

After power-up initialization, the remote control device 50 is operational and the analyzer 10 enters monitor mode to detect depression of either of the two keys (i.e., the 'start' and 'abort' keys/switches 51, 52) on the remote control device 50. The basic concept behind the remote communication is as follows (see FIG. 4):

a) The ISR 12, as a background task, continuously monitors (i) the CTS line of the serial port 30 for the depression of the abort key 52 and (ii) the DSR line for the depression of the start key 51.

(b) If a key press is detected, the ISR 12 queues-up the corresponding key into the keyboard buffers (not shown) assigned to the keyboard 13, thereby simulating a keyboard press and making the remote control device 50 transparent to the running application or diagnostic program.

Figure 4:
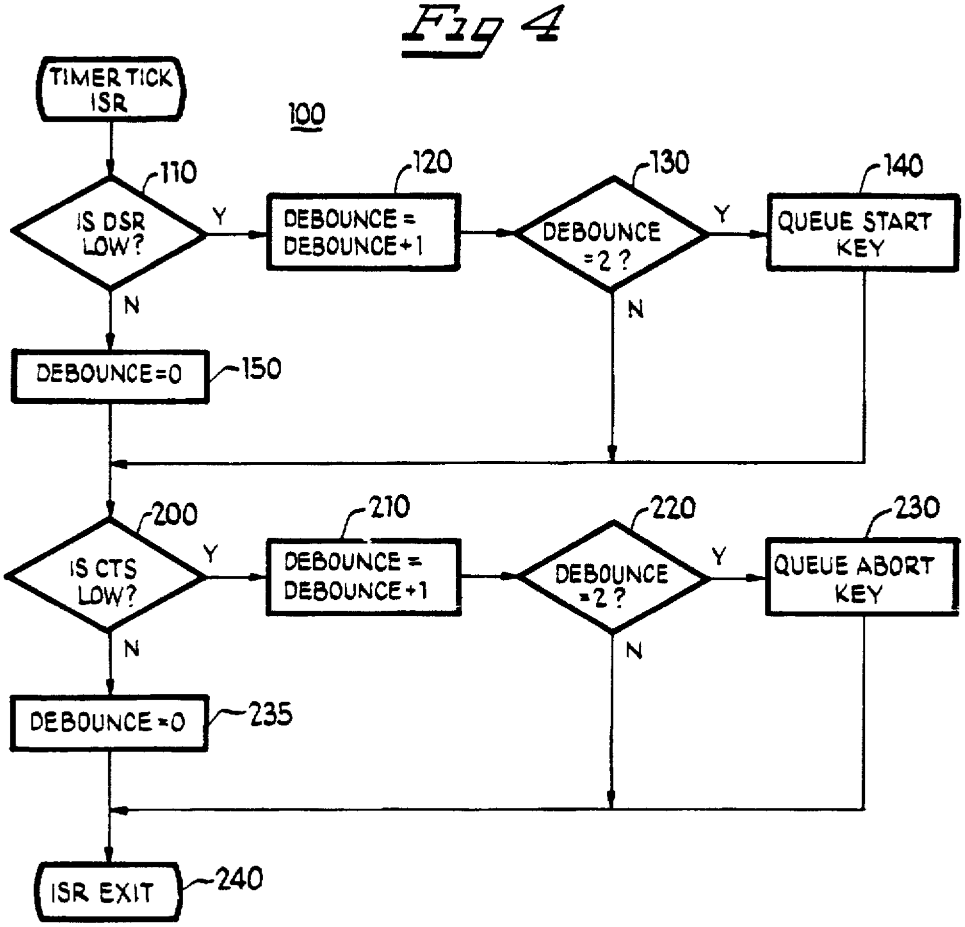
FIG. 4 is an operational system flowchart of the interrupt service routine which monitors communication signals on select lines of the host serial port electrically interfacing the remote control device to the host of FIG. 1.

The ISR 12 includes a timer tick hardware interrupt service routine 100 triggered by the engine analyzer 18.2 times each second. The operational flowchart for one timer tick interval of the interrupt service routine 100 is shown in FIG. 4.

First, the DSR line is quizzed (block 110) to determine whether DSR is asserted logic low, indicative that the start switch has been depressed on the remote control device 50. If so, a debounce counter is incremented by one count at 120 and the program then checks at 130 to see if the debounce count is 2. If not, it returns to the main loop at 200. If the debounce count is 2, indicating that the start switch has been depressed for two consecutive timer tick intervals, the 'start' key 51 function will be queued up into the keyboard buffers (block 140) before returning to the main loop at 200. If at 110 the DSR line is asserted logic high, indicative of no start key depression, then the DSR-debounce counter will be reset to zero and the routine will move to block 200 where the CTS line will be quizzed to determine if the CTS line has been asserted logic low, indicative that the abort key 52 has been depressed.

A CTS-debounce subroutine (blocks 210, 220) operates like the subroutine 120, 130 above, to detect when the CTS line is asserted low for two consecutive timer tick intervals. If so, the 'abort' key function is queued-up into the keyboard buffers (block 230). The routine 100 is then exited (block 240) and reentered a short time later (18.2 times each second). If, at 200, the CTS line is high, the debounce counter will be reset to zero at 235 before exiting the routine at 240.

It should be appreciated that the queuing method just described is related to queuing of key strokes on the keyboard 13. Since the queuing of the start and abort key presses are performed by intelligent software, as described above, no additional hardware is required to be added to the engine analyzer 10. Furthermore, the interfacing of the remote control device 50 is non-intrusive in that it does not affect the operational flow of the gas analyzer 20 with which it shares the serial port 30.

Because the interfacing of the remote control device 50 to the analyzer 10 is achieved using the unused lines of an otherwise dedicated port in combination with some intelligent software, such as the initialization and interrupt handling routines described above, the interfacing is easy, economical and practical.

In the context of an emissions test, the present invention allows a technician seated in the driver's seat of a vehicle to remotely start a diagnostic test—such as one requiring the gas analyzer 20 to be operably connected—by depressing the start key 51. If the remote control device 50 has been properly initialized, the power-indicating LED is lighted. Once the start key 51 is pressed, the start key function will be immediately queued-up by the ISR routine 100 and the test started. When the test is started, the engine analyzer 10 will toggle the RTS line causing the test-indicating LED 54 to blink intermittently to indicate a test is in progress. The test is optionally remotely aborted by the technician by depressing the abort key 52. The ISR routine 100 will detect key presses and take necessary action to queue-up the appropriate key functions.

It should be understood that while the present invention relates to the interconnection of a remote control device 50 to a special purpose computing system, namely an engine analyzer 10, the invention could easily be embodied in any general purpose computer having at least one serial communications port.

It should further be understood that, while in the preferred embodiment the serial port interface is a standard RS232 interface, the present invention can be easily adapted to a different type of communications interface so long as a minimum number of unused lines are available to facilitate simultaneously electrically coupling a remote control device, such as the one disclosed herein, or a like device interfaced in an equivalent manner.

While particular embodiments of the present invention have been shown and described, it will be appreciated by those skilled in the art that additional changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An engine analyzer system, comprising:

an engine analyzer including a processor unit for executing a stored program, timer interrupt logic coupled to said processor unit, a dedicated port for providing keystroke data to said processor unit for executing functions corresponding to keyboard-entered commands under control of said stored program, and a serial communications port composed of a prescribed number of conductors coupled to said interrupt logic;

a sensor coupled to some, but not all, of said conductors of said serial communications port, and configured for detecting a value of a prescribed engine operating condition parameter and supplying said value to said processor unit via said some of said conductors of said serial communications port; and a remote control device, coupled to a plurality of the conductors of said serial communications port that are unused by said sensor, and configured to impress voltage levels on said unused conductors representing engine analyzer operational commands;

said stored program, when executing, controlling said processor unit to interrogate said keyboard via said dedicated port, said sensor via said serial communications port conductors used by said sensor, and said remote control device via said plurality of said conductors of said serial communications port unused by said sensor, and, in response to predetermined voltage levels impressed on said plurality of conductors unused by said sensor, controlling said timer interrupt logic to simulate an operation of said keyboard and control said processor unit to control operation of said engine analyzer.

2. The engine analyzer system of claim 1, wherein the serial communications port is an RS-232 serial port, the unused conductors include those designated under RS-232 specifications as handshaking lines, and said stored program includes instructions to control an operation of said analyzer in response to voltage levels applied to said plurality of handshaking conductors by said remote control unit.

3. The engine analyzer system of claim 1, wherein said sensor comprises a gas analyzer.

4. The engine analyzer system of claim 2, wherein said sensor comprises a gas analyzer.

* * * * *